No. 728,420. PATENTED MAY 19, 1903.
M. G. DE SIMONE.
DIFFERENTIAL GEAR FOR MOTOR VEHICLES.
APPLICATION FILED FEB. 2, 1903.
NO MODEL. 2 SHEETS—SHEET 1.
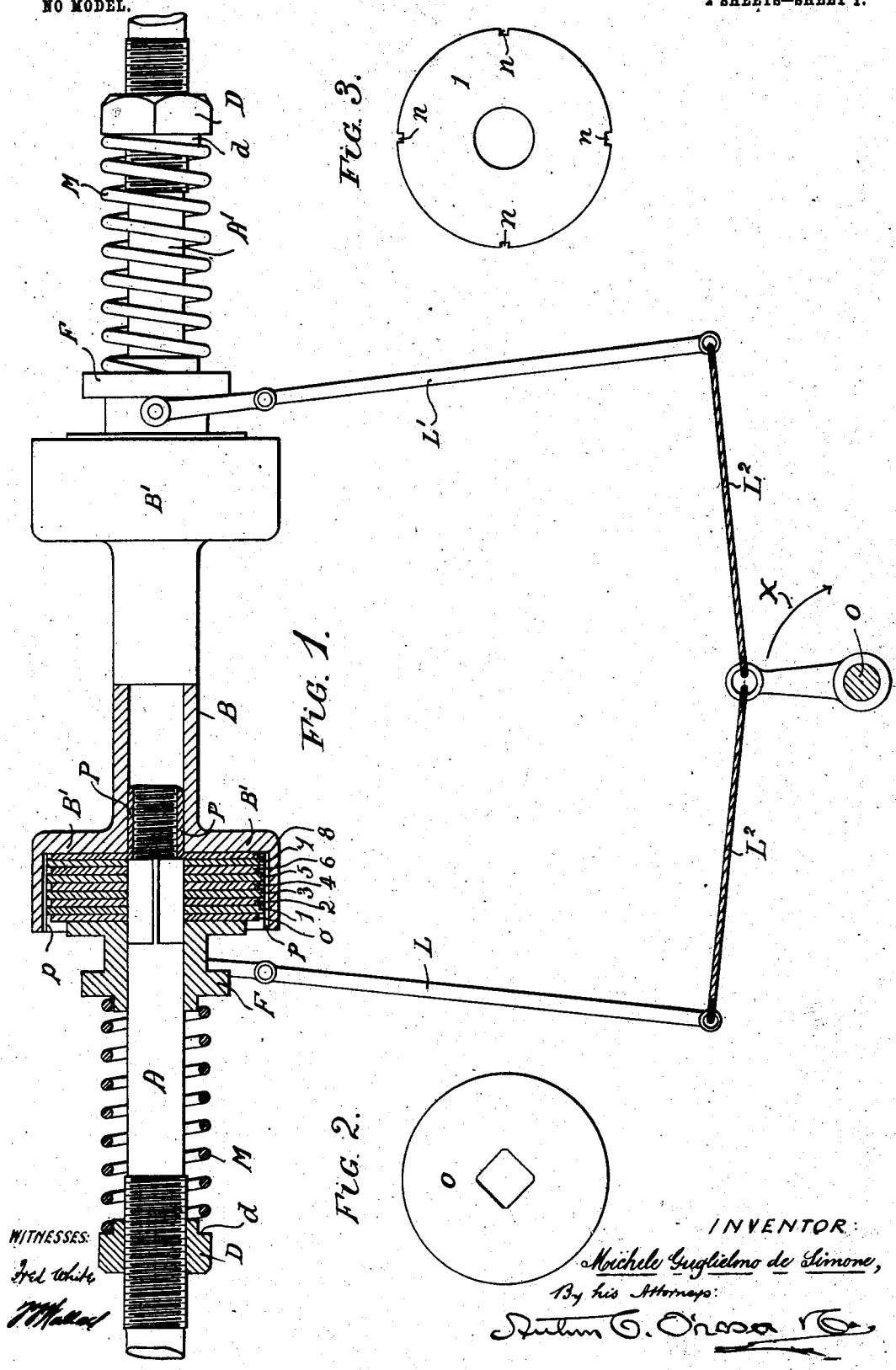
WITNESSES:
INVENTOR:
Michele Guglielmo de Simone,
By his Attorneys

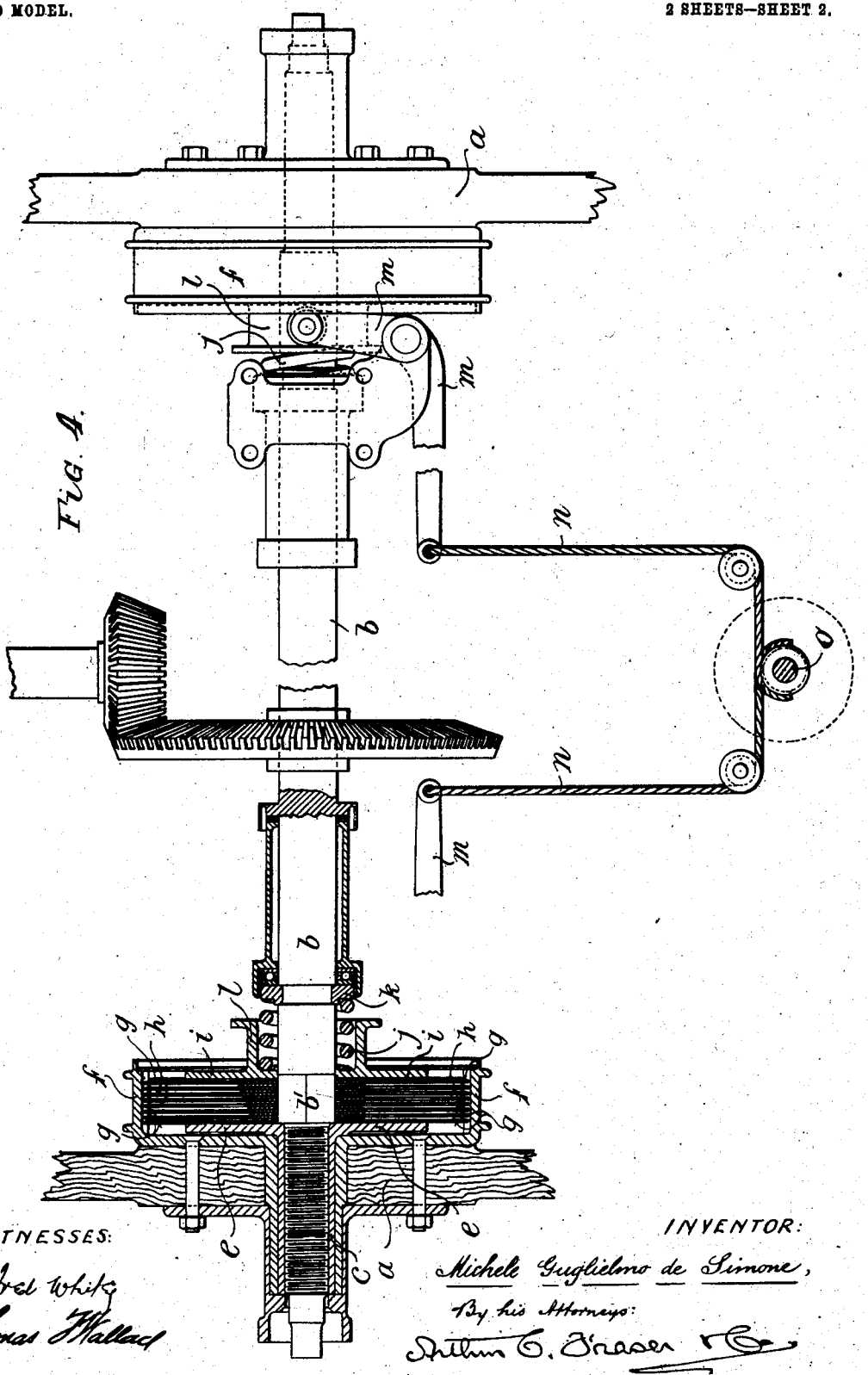

No. 728,420. Patented May 19, 1903.

UNITED STATES PATENT OFFICE.

MICHELE GUGLIELMO DE SIMONE, OF SPEZIA, ITALY.

DIFFERENTIAL GEAR FOR MOTOR-VEHICLES.

SPECIFICATION forming part of Letters Patent No. 728,420, dated May 19, 1903.

Application filed February 2, 1903. Serial No. 141,454. (No model.)

*To all whom it may concern:*

Be it known that I, MICHELE GUGLIELMO DE SIMONE, mechanical engineer, residing at 7 Via Carpenino, Spezia, Italy, have invented certain new and useful Improvements in Differential Gear for Motor-Cars and other Vehicles, of which the following is a specification.

This invention relates to differential gear for motor-cars and other vehicles.

Differential gear as hitherto made comprises two separate portions capable of independent movement at all times, and such gear usually consists of pinions carried by a revolving frame and gearing with bevel-wheels, one on the axle of each wheel, so that on any unequal resistance one of the wheels can revolve with a greater or less speed than the other. Consequently any roughness of the ground or obstacle met with causes one wheel to slacken speed, imparting an undulating movement to the vehicle when not required and rendering it necessary to give constant attention to the steering mechanism. Such action also renders it difficult for the vehicle to properly surmount any slight obstacle in its path.

It is the object of my invention to provide a differential gear which shall obviate these defects, while allowing of the proper differential motion when the wheels or vehicle are turned from the straight course by the steering-gear. To this end and according to my invention I connect a part driven by the motor to the opposite wheels through the medium of a clutch mechanism so adapted that the movement of the steering-gear to turn the vehicle, say, to the left serves to release the clutch on that side and allow the wheel thereat to have the necessary freedom of motion to compensate for the difference in motion between it and the wheel on the other side.

I have illustrated in the accompanying drawings one form of my improved differential gear.

Figure 1 is a half-sectional plan of a divided wheel-axle having my invention applied thereto. Figs. 2 and 3 are elevations of the disk portions of the clutch. Fig. 4 is a part-sectional plan of a modified form of the invention.

In the drawings, A A' are the two portions of a wheel-axle or parts to which the wheels are fixed. B is a sleeve inclosing the adjacent ends of said axle, which are free to revolve therein. The sleeve B is driven by the motor or other source of power and is connected at each side to the axles A A' through a clutch mechanism comprising a series of disks 1 3 5 7, carried and driven by the said sleeve and disposed alternately with other disks 0 2 4 6 8, driven by the axle. The number of said disks may be varied as required, and all the disks are adapted to slide longitudinally of the axle and are mounted in an enlarged portion B' of the sleeve. For this purpose the disks 1, 3, 5, and 7 are provided with peripheral notches $n$, which engage and slide upon feathers $p$ on the enlarged portion B' of the sleeve, while the disks 0 2 4 6 8 are carried upon a square portion $q$ of the shaft for the same purpose.

F is a sliding collar adapted to keep the disks in frictional contact with one another under the action of a spring M, the tension of the spring being regulated by a nut D, screwed upon the axle and having a recess $d$ for receiving the spring.

L L' are connecting-levers by which the sleeves F are slid into and out of gear with the disks by the movements of the steering-pillar $o$, the levers L L' being connected to the pillar $o$ by means of flexible connections, such as wire, rope, chain, or other suitable means, (indicated at $L^2$.) The steering-pillar $o$ may be connected directly to the front axle or may be provided with any usual or suitable connections to the front wheels. The thrust of the spring is confined to the axle by means of the nut D, on the one hand, and a nut or thrust-block P, secured upon the axle beyond the clutch mechanism. The disks may be of various forms in cross-section. For instance, they may be alternately concave and convex or corrugated, and they may be formed of a core or center plate, the frictional surfaces being covered with vulcanized fiber, hard and soft metal, leather, or other suitable material.

In the construction shown in Fig. 4 the wheels $a$ are mounted, so as to be free, at the ends of a through-axle $b$, which is in one piece. In this form the wheel-hubs are received upon a sleeve $c$, which is fixed to the axle and has a projecting flange or disk $e$. $f$ is a box or drum fixed to the wheel and projecting over and inclosing the flange $e$. Within the drum $f$ is inclosed the clutch mechanism, similar to that previously described and comprising a series of disks alternately disposed, one set, $g$, being connected to and adapted to drive the drum $f$ and the other set, $h$, being driven from the axle $b$ by a squared part $b'$ thereof. $i$ is a disk inclosing the friction-disks between it and the flange $e$ and pressed thereonto by a spring $j$, embracing the shaft and abutting at its other end against a ring $k$, fixed to the axle. The pressure-disk is extended to form a flanged collar $l$, which is slid upon the shaft against the action of the spring by a system of levers $m$ and connecting-ropes $n$ $n$ from the steering pillar or shaft $o$. I prefer to have each of the wheels fixed on one part of the axle and a separate motor-driven sleeve or similar member between the two parts of the axle, thus avoiding any substantial friction between the driven and driving parts when a clutch is released. Where the entire axle rotates constantly, even though a wheel be unclutched therefrom, it bears thereon by reason of the weight of the vehicle, and there is a tendency to transmit the rotation of the axle to the wheel, thus neutralizing, at least in part, the effect of unclutching and causing the vehicle to make a longer turn.

In operation of the form shown in Figs. 1 to 3, assuming the vehicle to be taking a straight course, the clutch mechanism on either side will be in full operation, connecting up the shafts A A', so that they form, as it were, a solid shaft, in which it is impossible for one end to move at a different speed to the other. Therefore should any obstacles be met by the wheels it will be properly surmounted without the vehicle altering its course. Should it, however, be desired to turn the vehicle from its course—as, for instance in passing around a corner—in the direction of the arrow X, the steering-pillar O is operated to turn the front pair of wheels, and immediately one of the connecting-levers—say L—is moved. The corresponding sleeve F is moved back against the spring M. The disks 0 to 8 are now released from end pressure, and consequently the disks on the shaft can move relatively to the disks carried by the sleeve, allowing the wheel on the axle A to have a necessarily slower motion than that on the axle A'. The flexible connection L² of the lever L' is simply slackened during this position of the parts, and the corresponding spring M holds the shaft A' clutched with exactly the same elastic pressure as when running straight. By reason of the combination of spring-clutches and flexible unclutching mechanism both clutches during straight running or the operative clutch during turning automatically yield or return to clutching position under all conditions. As soon as the corner is turned and the front steering-wheels are turned to resume a straight course the lever L, the corresponding sleeve F, and the disks of the corresponding clutch assume their original position, and the axles are rigidly connected, as before.

In the improved differential gear described the mechanical working thereof is independent of the conditions of adherence of the driving-wheels with the road. The gear is simple and can be made without teeth of any kind. The gear is only brought into operation when it is required and does not take up any of the speed of the motor or vehicle, because the opposite wheels to which it is fitted are rigid or rigidly connected when the gear is not in action.

The operation of the construction shown in Fig. 4 is similar to that shown in Figs. 1 to 3 and needs no further description.

What I claim as my invention, and desire to secure by Letters Patent, is—

1. The improved differential gear for vehicles, comprising the combination of a motor-driven part, a pair of wheels opposite and independent of each other, a clutch mechanism between each wheel and said motor-driven part comprising a sleeve, a series of longitudinally-slidable disks driven from said sleeve by connections with their periphery, a shaft within said sleeve, a series of similar disks connected to rotate with said shaft and disposed alternately with the disks driven by the sleeve, means for allowing said disks to slide longitudinally on the shaft and in the sleeve, and a spring for exerting pressure on the disks to maintain them normally in driving contact with one another, means including a steering-pillar for turning the vehicle from a straight course, and flexible means connected to said clutch mechanisms and operatively connected to said pillar whereby turning said pillar pulls on one of said connections and releases the corresponding clutch mechanism between one of the wheels and the motor-driven part and simultaneously slackens the other flexible member so as to leave the opposite clutch maintained in driving contact by its spring, substantially as and for the purpose set forth.

2. The improved differential gear for motor-cars and other vehicles comprising the combination of an axle in two parts, a pair of wheels one fixed on each part of the axle, a motor-driven member operatively connected to the two parts of the axle, a clutch mechanism between one part of the axle and said member, a clutch mechanism between the other part of the axle and said member, springs for keeping the said clutch mechanisms normally in driving contact, means including a steering-pillar for turning the vehicle from a straight course, and members of flexible material connected to said clutches and operatively connected to said pillar whereby turning said pillar pulls on one of said connections and releases the corresponding clutch mechanism between one of the wheels and the motor-driven part and simultaneously slackens the other flexible member so as to leave the opposite clutch maintained in driving contact by its spring, substantially as and for the purpose set forth.

3. In differential gear for vehicles the combination with a motor-driven part and wheels opposite and independent of each other, of a clutch mechanism between each wheel and the motor-driven part consisting of a sleeve, a series of longitudinally-slidable disks driven from said sleeve by connections at their periphery, a shaft within said sleeve, a series of similar disks connected to rotate with said shaft and disposed alternately with the disks driven by the sleeve, means for allowing the said disks to slide longitudinally on the shaft and in the sleeve, and means for exerting and releasing pressure on the disks and so causing them to move into and out of driving contact with one another, substantially as set forth.

4. In differential gear for vehicles the combination with a motor-driven part and wheels opposite and independent of each other, of a clutch mechanism between each wheel and the motor-driven part and comprising a sleeve on said part, a series of friction-disks sliding within said sleeve and driven from the same by keyways on their periphery, a shaft within said sleeve and having a squared portion, a series of friction-disks mounted so as to slide upon and be driven by the squared portion of said shaft and disposed alternately with the disks driven by the motor-driven part, a disk fixed to the shaft and disposed within said sleeve at its inner end, a pressure-disk extended into a flanged collar and sliding on the axle so as to inclose the friction-disks between it and the disk at the inner end of the sleeve, a spring disposed around the shaft between the pressure-disk and an abutment on the shaft, a lever engaging the collar on the pressure-disk and serving to slide the same against the action of the spring, and means connecting the said lever to the steering mechanism of the vehicle so that each clutch is released to free the wheel required, substantially as and for the purposes set forth.

In witness whereof I have hereunto signed my name in the presence of two subscribing witnesses.

MICHELE GUGLIELMO DE SIMONE.

Witnesses:
  HENRY A. PRYOR,
  ROBERT M. SPEARPOINT.